United States Patent Office 3,092,763
Patented June 4, 1963

1

3,092,763
MAGNETIC COUPLING THROUGH A
PLANE WALL
Guy Cherel, Clamart, France, assignor to Commissariat
a l'Energie Atomique, Paris, France
Filed Jan. 20, 1960, Ser. No. 3,668
Claims priority, application France Jan. 23, 1959
2 Claims. (Cl. 317—201)

The present invention relates to the transfer or transmission of mechanical motions or movements through a plane wall by magnetic coupling.

Known solutions of magnetic coupling through a plane wall consist of:

Placing on one side of the partition or wall, a magnet of set characteristics, and on the other a plate of soft iron. This type of coupling has the disadvantage of a weak transmission of force and for this reason is seldom used.

Placing on each side of the wall, two magnets of like characteristics, a better transmission than in the first case is thereby obtained and such couplers have found a few applications.

The object of the present invention is the realization of a magnetic coupling through a plane wall, of a higher efficiency than that of other such couplings used so far.

This coupling is essentially characterized in that it comprises two identical assemblies, located one on each side of the plane wall, each assembly consisting of a horseshoe magnet and a short plate of soft iron secured to the said magnet, perpendicularly to the axis of its poles, in such a way that the magnetic field of each of the said magnets is short circuited through the said short plate of soft iron, adapted to the magnet of the other assembly.

The magnetic coupling thereby achieved has a couple and a pulling off strength which are definitely superior to those of other known couplings.

The non-magnetic wall through which the transmission takes place, can be made, according to the invention, of various materials depending on the nature of the magnetic fields brought into play. For weak fields, in particular, the wall can advantageously be made of stainless steel having a thickness of a few millimeters whereas for stronger fields, the plastics are suitable materials.

To achieve a good stability of the coupling system, it is preferable, according to the invention, to use small polar pieces and to keep them as widely separated as possible. Under such conditions, it is possible to transmit by means of the coupling of the invention, couples 2 to 5 times higher than by means of an assembly that would comprise only a magnet and a small piece of soft iron.

The invention is applicable in all cases where it is desired to transmit a movement through a wall, and notably in magnetic telemanipulators, or in devices such as agitators, pumps, drums, etc. enclosed in a tightly closed-in or inaccessible space.

Referring to the accompanying schematic FIGURE 1 and 2, description will be given of two embodiments of the invention which should not be taken as having a limiting influence upon the scope thereof. The embodiment should be considered as representative of the invention but equivalent layouts should also be taken as being within the scope of the invention.

2

Figure 1:
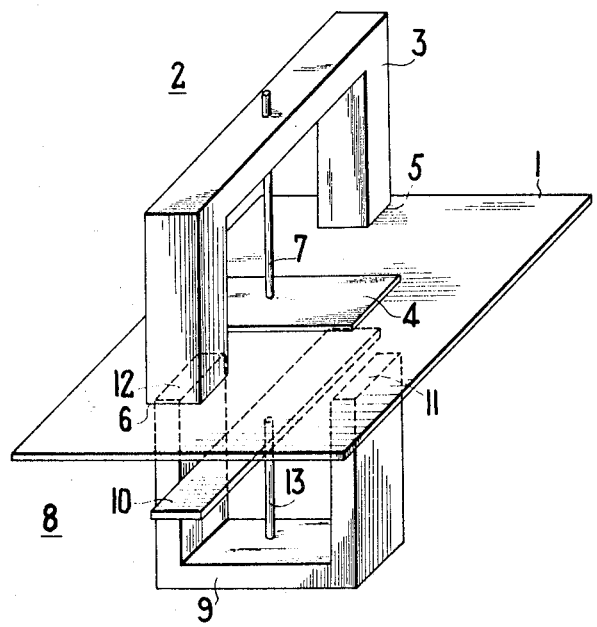
FIGURE 1 is a perspective view of a coupling according to the invention.

The coupling, realized through a wall 1 of stainless steel, say two millimeters in thickness, comprises two assemblies.

The first assembly 2 comprises a magnet 3 and a small plate of soft iron 4, perpendicular to the axis of poles 5 and 6 of magnet 3; the two parts being rigidly interdependent by means of a mechanical link 7.

The second assembly 8 comprises a magnet 9 and a small plate 10 of soft iron, perpendicular to the axis of poles 11 and 12 of magnet 9, the two parts being made integral by means of mechanical link 13.

The two assemblies are coupled in such a manner that the magnetic flux crossing the poles 5 and 6 of magnet 3 closes in after crossing the plane wall 1, through the small plate 10 of soft iron, and that the magnetic flux emerging from the poles 11 and 12 of magnet 9 closes in, after crossing the plane wall 1, through the small plate 4 of soft iron.

By other embodiments of the invention the plane wall may be of plastic materials.

Figure 2:
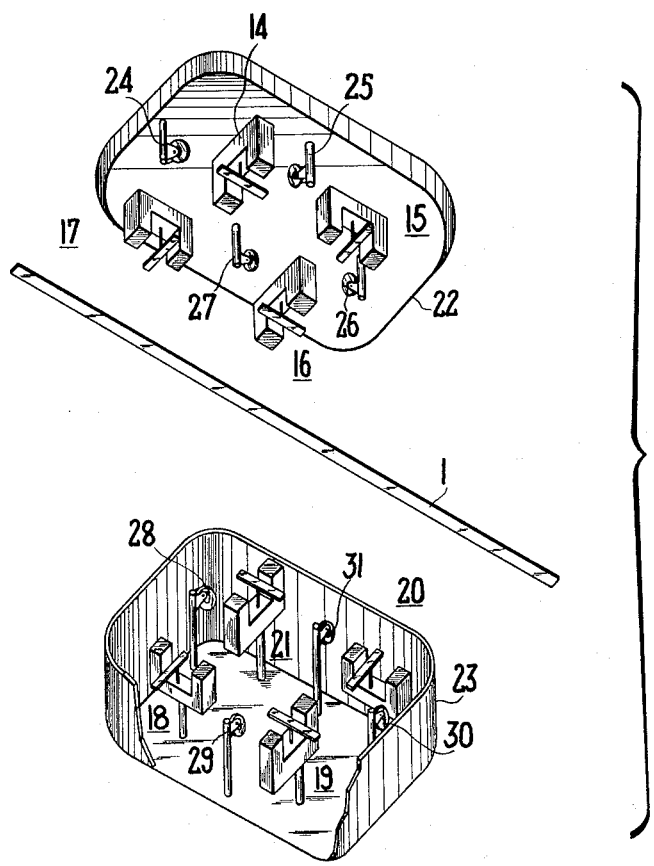
FIGURE 2 is a composite perspective view showing how the invention could be applied in the case where several magnets are used.

On FIGURE 2, there is shown a coupling comprising a group of 8 assemblies 14, 15, 16, 17, 18, 19, 20 and 21, according to the invention, secured, four by four respectively, to two half boxes 22 and 23. Each of the half-boxes 22 and 23 also comprises four small wheels (24, 25, 26, 27) for the half-box 22 and 28, 29, 30 and 31 for the half-box 23) which are applied against one side and the other of the plane wall 1 (seen in section on FIGURE 2) when the two half-boxes 22 and 23 are coupled. In this manner the four assemblies 14, 15, 16 and 17, are in co-operation with the assemblies 18, 19, 20 and 21 and any motion imparted to one of the half-boxes 22 or 23 by any mechanical means is communicated to the other on the other side of the plane wall 1.

I claim:

1. In a magnetic coupling through a plane wall, two identical assemblies located one on each side of the wall, each of said assemblies comprising a substantially horseshoe shaped magnet and a rectangular plate of soft iron secured to said magnet as an integral part thereof, the longer dimension of said plate being perpendicular to and lying substantially in the axis joining the poles thereof, the axes joining the poles of said magnets being substantially perpendicular whereby the magnetic field of each of the said magnets closes in said plate of said other assembly through the wall.

2. In a magnetic coupling through a plane wall, two half-boxes, a plurality of assemblies as described in claim 1 in said half-boxes, each of said assemblies of each of said half-boxes coacting with a corresponding assembly of the other of said half-boxes, and wheels carried by said half-boxes and engaging said wall facilitating movement of each half-box on the wall.

References Cited in the file of this patent
UNITED STATES PATENTS

| | | |
|---|---|---|
| 1,735,883 | Smith | Nov. 19, 1929 |
| 2,507,559 | D'Andrea | May 16, 1950 |
| 2,557,399 | Teetor | June 19, 1951 |
| 2,763,241 | Waggoner | Sept. 18, 1956 |